(12) United States Patent
Maruyama

(10) Patent No.: US 6,507,711 B2
(45) Date of Patent: Jan. 14, 2003

(54) CAMERA FOR BOTH SILVER-SALT PHOTOGRAPHY AND ELECTRONIC IMAGE PICKUP

(75) Inventor: Atsushi Maruyama, Sagamihara (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/825,015

(22) Filed: Apr. 3, 2001

(65) Prior Publication Data

US 2001/0040622 A1 Nov. 15, 2001

(30) Foreign Application Priority Data

Apr. 12, 2000 (JP) ........................................ 2000-111041

(51) Int. Cl.⁷ ........................ C03B 13/02; C03B 19/00; C03B 29/00; H04N 7/18; H04N 5/225
(52) U.S. Cl. ........................ 396/374; 396/429; 348/64; 348/333.11; 348/333.12; 358/909.1
(58) Field of Search ................................. 396/374, 429, 396/84, 296; 348/64, 333.02, 333.11, 333.12; 358/906, 909.1

(56) References Cited

U.S. PATENT DOCUMENTS 5,557,358 A * 9/1996 Mukai et al. ............... 396/296

FOREIGN PATENT DOCUMENTS

JP 10-104736 4/1998

* cited by examiner

Primary Examiner—David M. Gray
Assistant Examiner—Rochelle Blackman
(74) Attorney, Agent, or Firm—Straub & Pokotylo; John C. Pokotylo

(57) ABSTRACT

The camera of this invention has a zoom optical system 21, 23 which forms an object image on silver-salt film 27; an image capture element 15 which captures an electronic image of the above object image; and an image capture optical system 2, 11, 13, 14 which forms the object image on the image capture element. The image capture optical system is provided separately from the zoom optical system, and has an angle of view which covers the broadest photography angle of view of the zoom optical system. The above camera also has memory which stores the image data of an image capture bounding frame; a signal processing circuit 45 which merges the electronic image captured by the image capture element and the image data of the photography bounding range stored in memory; and a monitor device 8 which displays the electronic image merged by the signal processing circuit. The signal processing circuit 45 enlarges the electronic image by a prescribed enlargement factor, and reduces the image data of the image capture bounding frame by a prescribed reduction factor, based on the focal length of the zoom optical system.

11 Claims, 8 Drawing Sheets

CAMERA FOR BOTH SILVER-SALT PHOTOGRAPHY AND ELECTRONIC IMAGE PICKUP

This application claims benefit of Japanese Application No.2000-111041 filed in Japan on Apr. 12, 2000, the contents of which are incorporated by this reference.

BACKGROUND OF THE INVENTION

1. Field of the Invention

This invention concerns a camera for both silver-salt photography and electronic image pickup, having the functions of both an electronic image pickup device which has an electronic image pickup element to convert the object image into electrical signals, and of a silver-salt photography device which transfers the object image to silver-salt film.

2. Description of the Related Art

In the prior art, cameras for both silver-salt photography and electronic image pickup have been utilized, having the functions of both an an electronic image pickup device which has an electronic image pickup element to convert the object image into electrical signals, and of a silver-salt photography device which transfers the object image to silver-salt film.

This type of camera generally exposes the silver-salt film to the object image, simultaneously storing in memory electronic image signals which are photoelectrically converted by the above electronic image pickup element, and displays on a monitor the object image based on the stored electronic image signals, thereby enabling display for the purpose of verification of the result at the time of photography, which is not possible using conventional silver-salt cameras. That is, the result can be confirmed through monitor display at the time of photography without development, to confirm that the image has been photographed on film according to the photographer's intention; this is an extremely convenient function for the photographer, and is effective with respect to reliability of the photographic process.

One such camera is the camera for both silver-salt photography and electronic image pickup (also called a "hybrid camera") proposed by the present applicant in, for example, Japanese Patent Laid-open No. 10-104736.

The camera for both silver-salt photography and electronic image pickup of this proposal comprises signal processing means to perform signal processing of electronic image signals photoelectrically converted by the above electronic image pickup element, and of electronic image signals read from memory, and which controls monitor display by using the signal processing means to perform mask processing or enlargement processing of electronic image signals for monitor display after photography, for example, such that the size and shape match those of the silver-salt photography image.

However, accompanying trends toward multifunctionality of recent years, some of the above cameras are equipped with electronic zoom functions enabling the optical or electronic enlargement or reduction of the object image. Without moving, the photographer can view the object to be photographed in the optical view-finder, enlarged to a desired size, and after displaying the object on a monitor for confirmation using the electronic zoom function, can expose the silver-salt film to the object image at that size to take the photograph.

However, in the camera for both silver-salt photography and for electronic image pickup described in the above-mentioned Japanese Patent Laid-open No. 10-104736, when the electronic zoom function is used in photography, if the zoom factor in the silver-salt system zoom optical mechanism is high, the enlargement factor for the electronic image is also high, so that as a result there is the problem that the image displayed on the monitor becomes coarse and is difficult to view.

SUMMARY OF THE INVENTION

This invention was devised in light of the above problem, and has as one object the provision of a camera for both silver-salt photography and for electronic image pickup in which, during photography using the electronic zoom function, the image displayed on the monitor does not become coarse even when the zoom factor of the silver-salt system zoom optical mechanism is high, so that satisfactory displayed images can be obtained.

A camera of this invention has a zoom optical system to focus the object image on silver-salt film, an image pickup element for pickup of the electronic image of the object, and an image pickup optical system to focus the object image on the image pickup element. This image pickup optical system is provided separately from the zoom optical system, and has an angle of view which covers the broadest photography angle of view of the zoom optical system. Further, the above camera has memory to store image data for an image capture bounding frame, a signal processing circuit to merge the electronic image captured by the image capture element and the image data of the image capture bounding frame stored in memory, and a monitor device to display the electronic image merged by the signal processing circuit. Moreover, the signal processing circuit merges the data after enlarging the electronic image by a prescribed factor based on the focal length of the zoom optical system, and reduces the image data of the image capture bounding frame by a prescribed factor.

A camera of this invention has a zoom optical system to focus the object image on the silver-salt film of the silver-salt photography means, and an image pickup optical system to focus the object image on the image pickup element. The image pickup optical system is provided separately from the zoom optical system, and has an angle of view which covers the broadest image capture angle of view of the above zoom optical system. Further, the above camera has a signal processing circuit which enlarges the electronic image captured by the image capture element according to the focal length of the zoom optical system, and merges a frame indicating the image capture range with this enlarged electronic image, as well as a monitor to display the electronic image processed by this signal processing circuit. The size of the frame indicating the image capture range in the electronic image merged by the signal processing circuit is substantially equal to the image capture range of the above silver-salt photography means.

A camera of this invention has a zoom optical system to focus the object image on silver-salt film, and an image pickup optical system to focus the object image on the image pickup element. The image pickup optical system is provided separately from the zoom optical system, and has an angle of view which covers the broadest photography angle of view of the zoom optical system. The above camera further has a signal processing circuit which enlarges the electronic image captured by the image pickup element according to the zoom factor of the zoom optical system, and a monitor device which displays the electronic image enlarged by the signal processing circuit, and also displays, on the displayed image, an image capture bounding frame of size substantially equal to the object image focused on the silver-salt film.

A camera of this invention has a photography optical system, the focal length of which is variable, for exposure of silver-salt film to an object image; an optical view-finder having a visual field substantially equal to the photographic angle of view of the photography optical system; an image pickup optical system, provided separately from the photography optical system, to capture the above object image by an electronic image pickup element; a monitor device to display the electronic image captured by the image pickup element; and a signal processing circuit to control the monitor device. The signal processing circuit enlarges and displays the electronic image at an enlargement factor according to the focal length of the photography optical system, and controls the monitor device so as to display a bounding frame, substantially equal to the visual field of the optical view-finder, superimposed on the displayed image.

A camera of this invention has silver-salt photography means, including a photography optical system with variable focal length, to transfer an object image to silver-salt film; electronic image pickup means, including an image pickup optical system having an angle of view which includes the photographic angle of view of the silver-salt photography means, to capture and convert into an electronic image the object image; electronic zoom means to enlarge by a prescribed enlargement factor the electronic image captured by the electronic image pickup means, based on the focal length of the photography optical system; and display means to display the electronic image enlarged by the electronic zoom means, and to display in superimposition a frame indicating the photographic angle of view of the silver-salt photography means, according to the enlargement factor of the photography optical system and the enlargement factor of the electronic zoom means.

A camera of this invention has electronic image capture means to capture and convert into an electronic image the object image; silver-salt photography means to transfer the object image to silver-salt film; an optical view-finder having a visual field substantially equal to the photographic angle of view of the silver-salt photography means; electronic zoom means to enlarge by a prescribed factor a captured electronic image; image capture bounding frame generation means to generate an image capture bounding frame of a prescribed size; image merging means to merge the electronic image output from the electronic zoom means and the bounding frame output from the image capture bounding frame means; and a monitor to display the electronic image output from the image merging means; and which is set such that the size of the image capture bounding frame in the merged electronic image which is displayed on the monitor is substantially equal to the visual field of the optical view-finder.

A camera of this invention has silver-salt photography means, including a photography optical system with variable focal length, to transfer the object image to silver-salt film via the photography optical system; electronic image capture means, including an image capture optical system separate from the silver-salt photography means, having an image capture range which is broader than the image capture range of the silver-salt photography means; and display means to display on a monitor screen the electronic image captured by the electronic image capture means; and, in which the display means displays a bounding frame equal to the image capture range of the silver-salt photography means, superimposed on the displayed image.

A camera of this invention has silver-salt photography means, including a photography optical system with variable focal length, to transfer the object image to silver-salt film via the photography optical system; an optical view-finder having a visual field substantially equal to the silver-salt photography means; electronic image capture means, including an image capture optical system separate from the photography optical system, and having an image capture range broader than the image capture range of the silver-salt photography means; and display means to display on a monitor screen the electronic image captured by the electronic image capture means; and, in which the display means displays a bounding frame equal to the visual field of the optical view-finder, superimposed on the displayed image.

DESCRIPTION OF THE PREFERRED EMBODIMENTS

Figure 1:
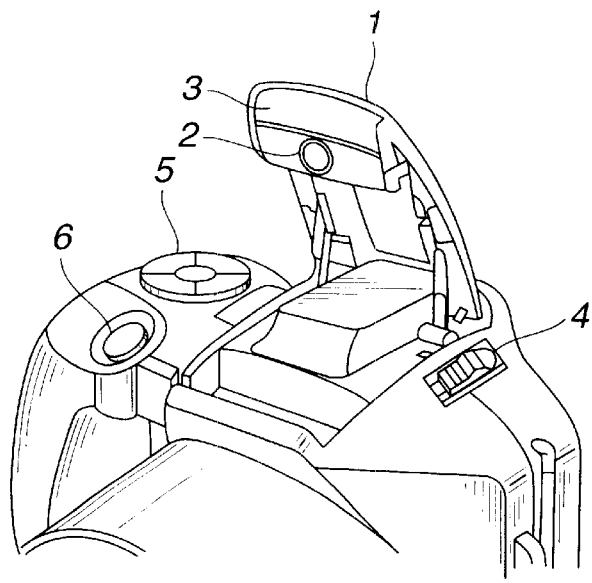
FIG. 1 shows one aspect of a camera for both silver-salt photography and electronic image pickup, and is a perspective view, seen from the upper front, of the camera in a state in which the pop-up unit is popped up.

Aspects of this invention are explained below, referring to the drawings.

Figure 2:
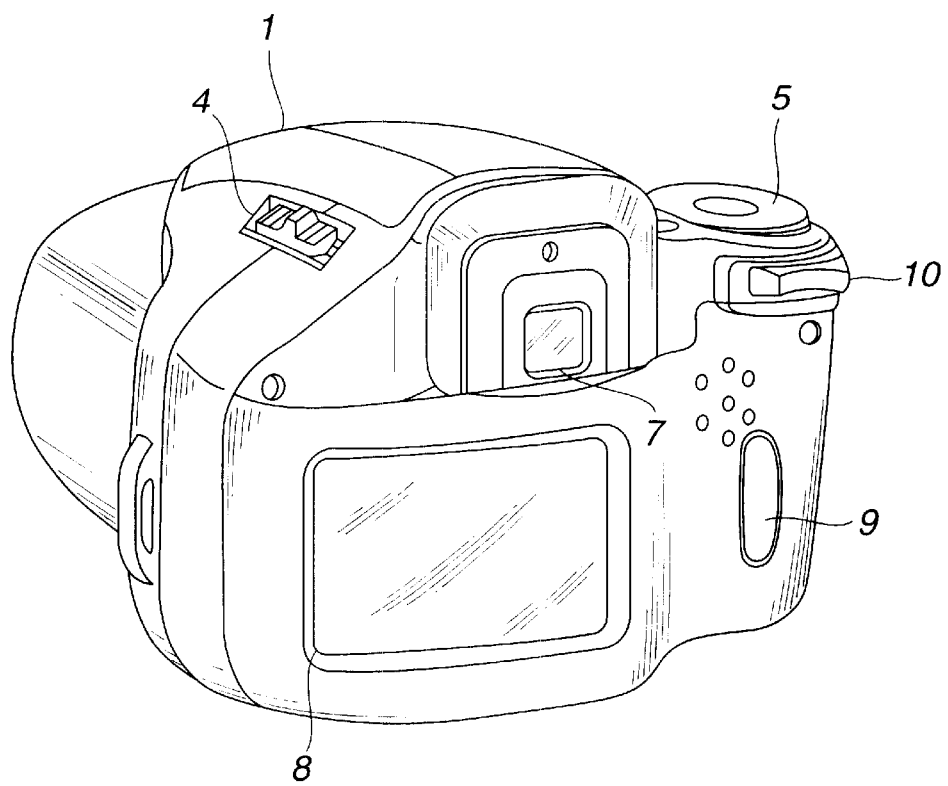
FIG. 2 shows one aspect of a camera for both silver-salt photography and electronic image pickup, and is a perspective view, seen from the back, of the camera in a state in which the pop-up unit is stored.
Figure 3:
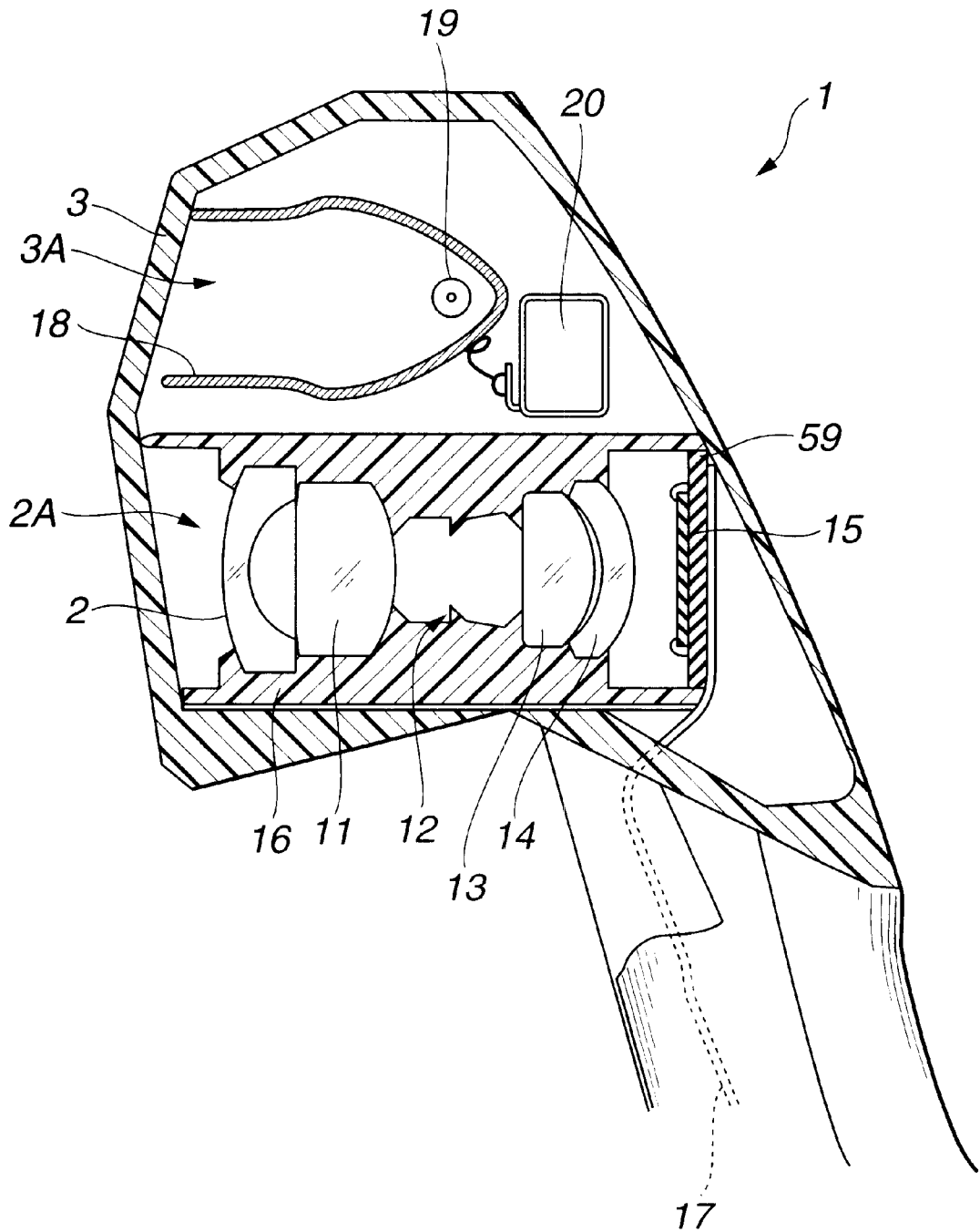
FIG. 3 is a cross-sectional view of the pop-up unit shown in FIG. 1.

FIGS. 1 through 10 show aspects of the camera for both silver-salt photography and electronic image pickup of this invention; FIGS. 1 through 3 are drawings which explain the general configuration of the camera.

First, FIGS. 1 through 3 are used to explain the external configuration of the camera of this invention and the pop-up unit.

As shown in FIG. 1, in the center of the upper part of the camera of this aspect is positioned a pop-up unit 1, comprising strobe emission means and an image pickup unit. On the upper surface of the camera is positioned a power switch 4 to turn the camera power supply on and off. And, on the upper surface of the camera, in the position opposite the above power switch 4 are positioned a release switch 6 indicating the beginning of operation of the silver-salt photography device or of the electronic image capture device, and a setting button 5 as a photography mode setting means to indicate and set the photography mode.

On the front side of this pop-up unit 1 are positioned a lens 2, which is one member of an image pickup optical system to form an object image on the electronic image pickup element, and an emission panel 3 to transmit strobe light. This pop-up unit 1 is installed so as to enable pop-up from the camera. This pop-up unit 1 is configured so as to pop-up mechanically from the camera, linked by the on-operation of the above power switch 4.

On the back side of the camera are provided and positioned an eyepiece window 7 for the optical view-finder, to enable monitoring of the object image based on object light passing through the silver-salt photography lens, as shown in FIG. 2, and a color liquid crystal panel or other liquid crystal monitor device (hereafter "LCD monitor") 8 for display of electronic images captured by the electronic image capture element. In back of the camera are positioned a verification window 9 to enable verification of the type of film loaded into the film, and a seesaw-type zoom up/down operation button 10 to enable manual changes to the focal length of the zoom lens of the photography lenses.

Next, the configuration of the pop-up unit 1 is explained in detail, referring to FIG. 3.

As shown in FIG. 3, the pop-up unit 1 comprises a strobe light emission means 3A and image pickup unit 2A. The image pickup unit 2A comprises image pickup lenses 2, 11, 13, 14 which are the image pickup optical system; a semiconductor IC chip 15; mirror frame 16; and flexible board 17.

The image pickup lenses 2, 11, 13, 14 are positioned within the pop-up unit 1, as shown in the figure; and by means of the above mirror frame 16, these image pickup lenses are supported and fixed in place. Here negative lenses are used as the image pickup lenses 2, 14, and positive lenses are used as the other image pickup lenses 11, 13.

The IC chip 15 is a semiconductor device which, for example, is formed using CMOS (Complementary Metal Oxide Semiconductor) processes and comprises a CMOS imager (CMOS image sensor), which is an electronic image pickup element. The IC chip 15 is positioned at the end of the optical path of the above plurality of image pickup lenses, and is electrically connected to the board 59. On top of this IC chip 15, the object image is focused via these image pickup lenses, and the image optical signals based on the object image are converted into electrical signals, which are supplied to the flexible board 17 via the electrically connected board 59.

A diaphragm 12 is integrated with the above mirror frame 16, and this diaphragm 12 is provided so as to intervene between the image pickup lenses 11 and 13.

On the flexible board 17 is provided the board 59, and the above IC chip 15 is mounted via this board 59. The extending part of the flexible board 17 is connected to the camera body from within the pop-up unit 1, and the base part is electrically connected to a signal processing circuit incorporated within the camera body. By this means, electrical image signals (also called image signals) output from the above IC chip 15 are supplied to the signal processing circuit within the camera body.

On the other hand, the strobe light emission means 3A comprises an emission panel 3, strobe reflecting hemisphere 18, emission tube 19, and trigger transformer 20.

The emission tube 19 emits strobe light; emission occurs by the excitation of xenon gas sealed into the emission tube 19, caused by the above trigger transformer 20. Strobe light emitted by this emission tube 19 is irradiated in the object direction by means of the strobe reflection hemisphere 18.

Next, the configuration of the electrical circuitry in an aspect with the external configuration described above is explained in detail, referring to FIG. 4.

First, the part concerning the silver-salt photography device is explained.

Figure 4:
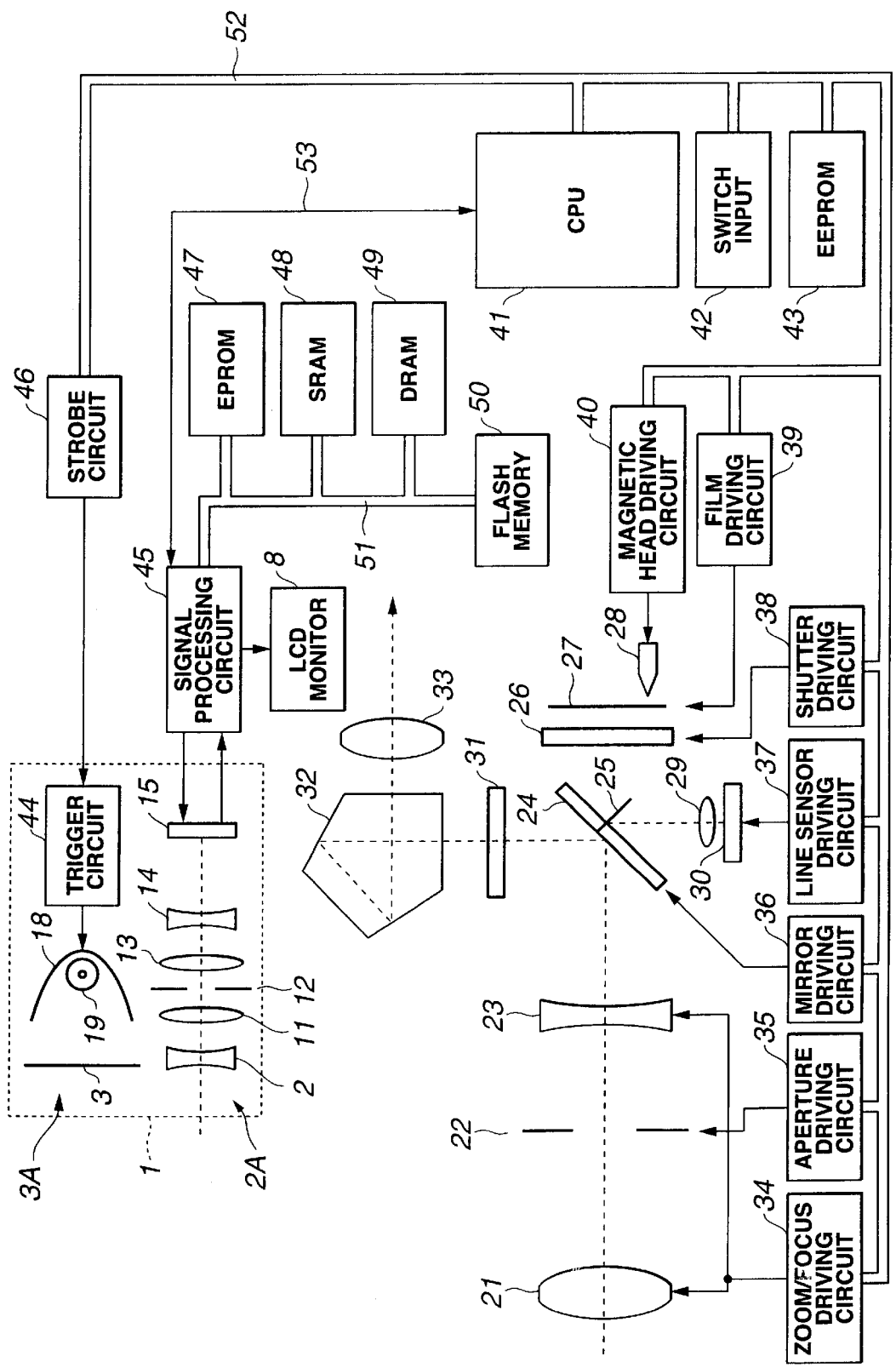
FIG. 4 is a drawing showing the overall configuration of the entire camera shown in FIG. 1, including the electrical circuit block.

In FIG. 4, photography lenses comprising a zoom-capable photography optical system to focus the object image comprises the positive lens 21 and negative lens 23; an aperture diaphragm mechanism 22 is positioned between these photography lenses. This diaphragm mechanism 22 is driven and controlled by an aperture driving circuit 35.

Behind the negative lens 23 is provided a movable mirror 24, the part in approximately the center of which is a half-mirror. In the back part of the center of this movable mirror 24 is provided a sub-mirror 25, so as to reflect the object light downward.

In the direction of the reflection optical axis of this sub-mirror 25 is placed a separator optical system 29 for two-image separation, and comprising two optical systems in the direction approximately perpendicular to the drawing. The line sensor 30 is positioned at the focal position of the object image due to the separator optical system 29, and this line sensor 30 is connected to a line sensor driving circuit 37.

By means of the sub-mirror 25, separator optical system 29, and line sensor 30, a publicly known focal point detection device employing the phase-difference method is configured. Based on the signal input via the line sensor driving circuit 37, the central processing unit (CPU) determines the interval between two images, and calculates photography lens driving amount data in order to drive lenses to the focused position.

The above driving amount is sent to the zoom/focus driving circuit 34, and focal positions of each of the above photography lenses 21, 23 are changed. This zoom/focus driving circuit 34 comprises a well-known electromagnetic motor, ultrasonic motor or other driving source, as well as a driver circuit to control the driving source, and an encoder device or similar to detect lens positions.

On the reflected optical path of the above movable mirror 24 are positioned a focusing glass 31, pentagonal prism 32, and view-finder ocular optical system 33. In this aspect, the reason for adding an LCD monitor 8, described below, as an object monitor and for providing the above optical view-finder (see the eyepiece window 7 of FIG. 2) is that, rather than taking photographs while viewing the LCD monitor 8, the camera holding performance is improved and shaking of the hands or similar problems are more easily prevented if the camera operator takes pictures while looking through an optical view-finder.

The above-mentioned movable mirror 24 is driven by a mirror driving circuit 36. The shutter 26 is driven by the shutter driving circuit 38. When the movable mirror 24 rises and the shutter 26 is in the open state, the object image is formed on the silver-salt film 27, which is exposed.

The CPU 41 calculates the aperture value of the diaphragm and the shutter speed necessary to obtain appropriate exposure, based on the object brightness output from the signal processing circuit 45, described below, the film sensitivity detected by a film sensitivity detection circuit, not shown, and a program diagram, not shown. The shutter 26 is driven and controlled at the shutter speed obtained from these calculations.

A magnetic recording layer is formed on the silver-salt film 27, and a magnetic head 28 is positioned so as to be in contact with this magnetic recording layer. This magnetic head 28 is driven by the output of the magnetic head driving circuit 40, and magnetically records various information. Within the camera body is provided a film driving circuit 39; when picture-taking for one frame is completed, this film driving circuit 39 winds the above film 27. Magnetic recording by the above magnetic head 28 is executed during this winding operation.

The switch input unit 42 includes the input from a first release switch which is turned on in response to halfway depression of the release switch 6, and from a second release switch which is turned on in response to full depression of the release switch. The switch input unit 42 also includes input from a power switch 4 which operates in response to a slide switch, from a pictograph button 5 or other operating switches to set the photography mode, or from a plurality of switches, not shown, which detect camera mechanism operation or perform other functions. The switch input unit 42 generates, and supplies to the CPU 41, operation signals based on these switch operations.

The EEPROM (Electrically Erasable and Programmable Read-only Memory) 43 is non-volatile memory. In the EEPROM 43 are stored, for example, adjustments necessary for each camera in order to suppress scattering among cameras at the time of shipment from the factory.

Next, parts related to the electronic image pickup device are explained.

In FIG. 4, the image pickup unit 2A comprised by the electronic image pickup element device comprises the positive lenses 11, 13 and negative lenses 2, 14, which are image pickup lenses to focus the object image on the CMOS imager formed on the IC chip 15, as described above. Among these image pickup lenses, a fixed diaphragm 12 is positioned. These components are incorporated within the pop-up unit 1 as described above. The image pickup optical system comprising these image pickup lenses is provided separately from the above-mentioned zoom optical system of the silver-salt photography equipment.

The object image focused on the CMOS imager of the IC chip 15 is converted into analog image signals, and these are further converted into digital image data by a control circuit, not shown, formed on the IC chip 15, and are output to the signal processing circuit 45.

The signal processing circuit 45 internally comprises a RISC (Reduced Instruction Set Computer) processor, color processor, and JPEG core. These processors and other components perform compression and expansion of digital image signals obtained from the IC chip 15, white balance processing, edge enhancement processing, electronic zoom processing and merging of the electronically zoomed image with an image capture bounding frame as described below, conversion into composite signals (luminance signals, color-difference signals) for output to the LCD monitor 8, and other processing.

The EPROM (Erasable and Programmable Read-only Memory) 47 stores the program processed by the processor comprised by the signal processing circuit 45. The SRAM (Static Random Access Memory) 48 and DRAM (Dynamic Random Access Memory) 49 are memory used for temporary storage of images before image processing and of images during image processing. The flash memory 50 is non-volatile memory which stores finalized images; the stored contents are preserved even when the camera power supply is turned off.

In this aspect, the image pickup angle of view of the image pickup lenses is substantially equal to the image pickup angle of view of the shortest focal length (so-called wide conversion) of the photography lenses 21, 23. The photography optical system need only have an angle of view at least equal to the broadest photography angle of view of the photography lens zoom optical system.

When the focal length of the photography lenses 21, 23 is changed by the zoom/focus driving circuit 34, the electronic image is enlarged to the prescribed magnification (electronic zoom) by the above signal processing unit 45. At this time, the electronic image displayed by the LCD monitor 8 includes the image capture range recorded on the silver-salt film 27.

Next, the strobe light emission device 3A is explained.

In the strobe light emission device 3A comprised by the electronic image pickup element equipment in FIG. 4, light is emitted by excitation of xenon gas sealed in the emission tube 19, by means of a trigger signal output from a trigger circuit 44 comprising, at least, a trigger transformer 20. This emitted light is reflected by the strobe reflecting hemisphere 18, passes through the emission panel 3, and is incident on the object.

The above trigger circuit 44, emission tube 19 and reflecting hemisphere 18 are incorporated within the pop-up unit 1, and the emission panel 3 is installed in the face of the above-described pop-up unit, on the object side (see FIG. 3).

In this aspect, the strobe light emission angle of view is substantially equal to the image pickup angle of view of the shortest focal length (so-called wide conversion) of the photography lenses 21, 23. The strobe control circuit 46 controls charging of a strobe main capacitor, not shown, and light emission instructions sent to the trigger circuit 44.

In a camera configured in this way, the above-described strobe circuit 46, zoom/focus driving circuit 34, aperture (diaphragm) driving circuit 35, mirror driving circuit 36, line sensor driving circuit 37, shutter driving circuit 38, film driving circuit 39, magnetic head driving circuit 40, EEPROM 43, switch input unit 42, and CPU 41 are electrically connected by the data bus 52, and the control signals, information signals, and other data necessary to execute the various functions are exchanged via this data bus 52.

The CPU 41 executes central control of the operations of these driving circuits. In addition, the data bus 51 is connected to the above signal processing circuit 45. This data bus 51 is connected to the EPROM 47, SRAM 48, DRAM 49, and flash memory 50. In this case also, electronic image data and other data is exchanged between the signal processing circuit 45, EPROM 47, SRAM 48, DRAM 49 and flash memory 50 via the data bus 51. Operation of these circuits is centrally controlled by a processor, not shown, within the signal processing circuit 45.

The above CPU 41 and signal processing circuit 45 are connected by a communication line 53. Exchange of timing for capture of image signals, control signals to coordinate the timing of electronic image capture and silver-salt photography, and other control signals and data takes place via this communication line 53.

In the camera of this aspect, the above CPU 41 and signal processing circuit 45 execute display image processing control such that the size of the image capture bounding frame in the merged electronic image displayed on the LCD monitor 8 is substantially equal to the image capture range of the above silver-salt photography means.

Figure 5:
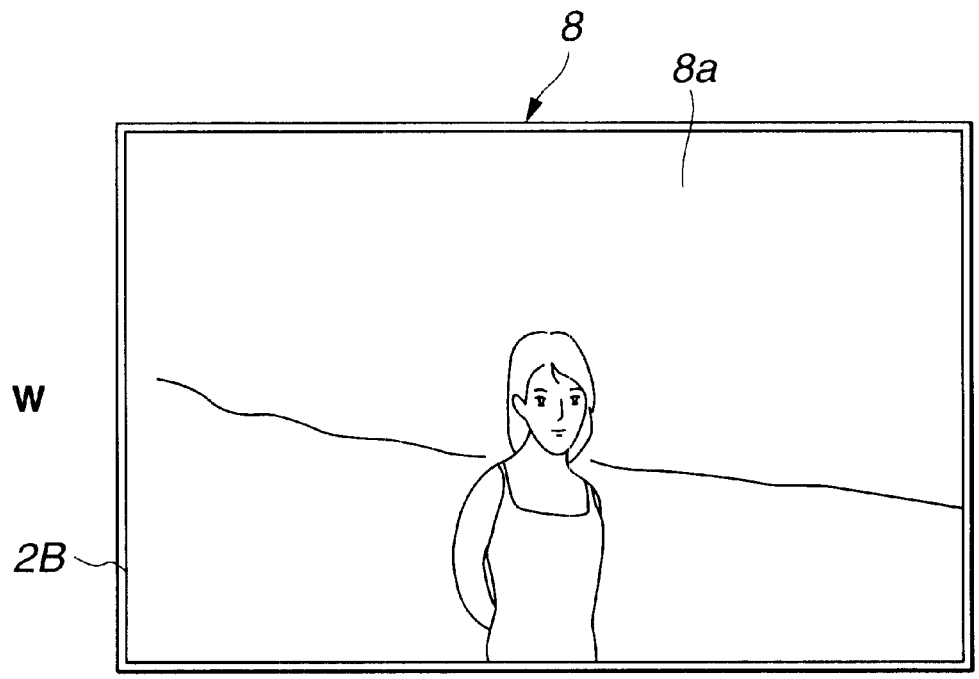
FIG. 5 is a drawing showing an example of the monitor display image generated by image processing of the camera.
Figure 6:
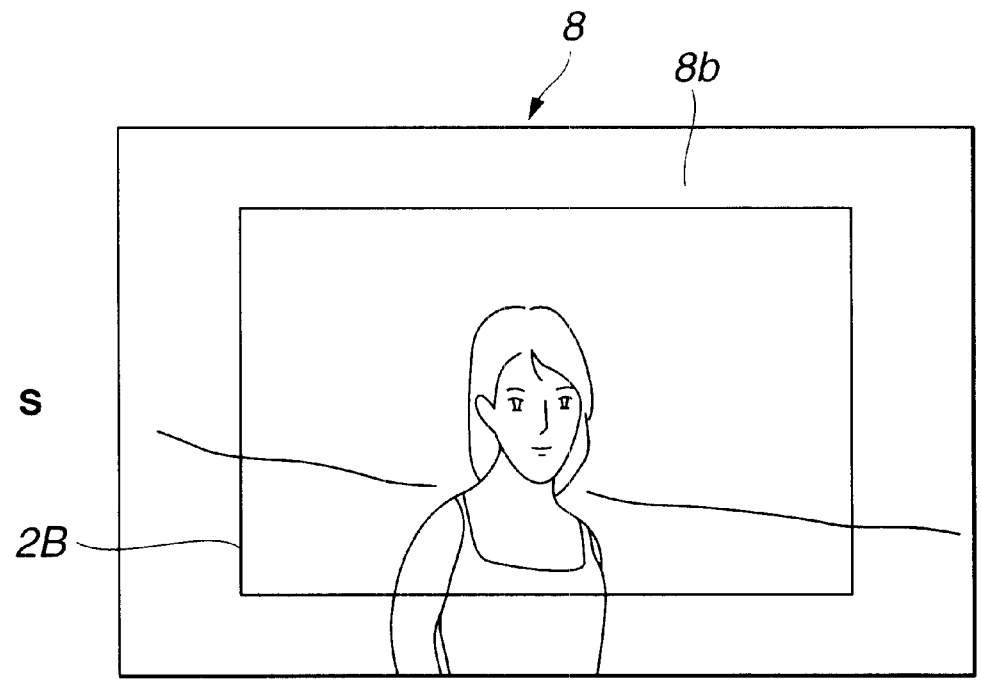
FIG. 6 is a drawing showing an example of the monitor display image generated by image processing of the camera.
Figure 7:
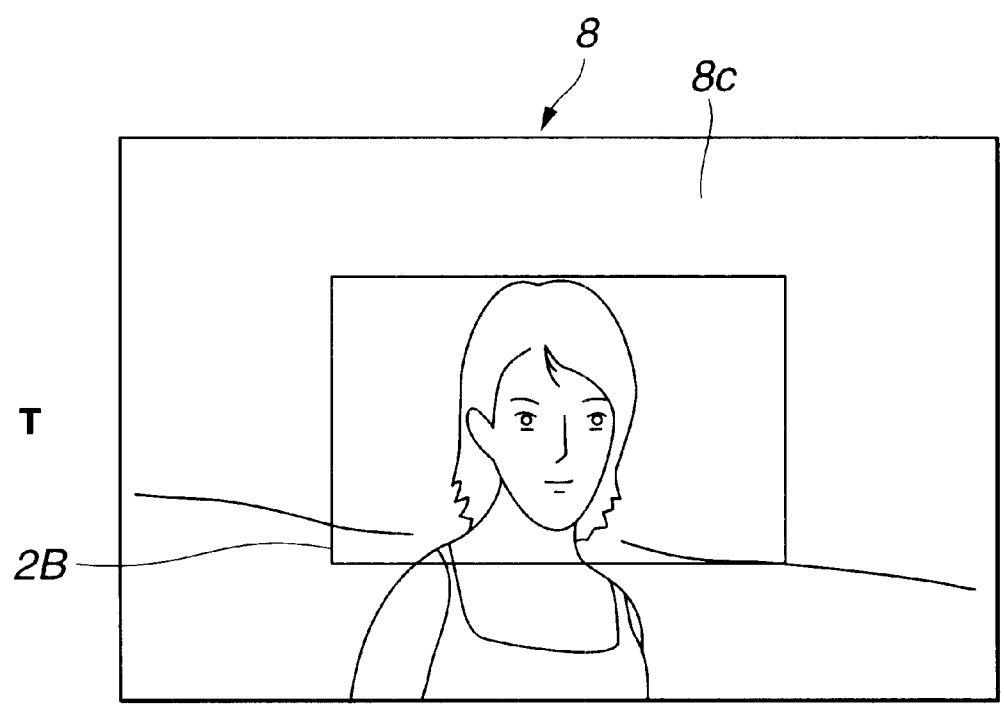
FIG. 7 is a drawing showing an example of the monitor display image generated by image processing of the camera.

Examples of display images displayed on the monitor by means of image signal processing by the signal processing circuit 45 are shown in FIGS. 5 through 7. That is, the examples of monitor display images shown in FIGS. 5 through 7 are electronic images in which the image capture bounding frame of the electronic image, generated so as to be substantially equal to the photography angle of view of the silver-salt photography equipment by image processing in the camera of this aspect, is displayed on the monitor screen of the LCD monitor 8 superimposed on the electronic image. In this case, the image within the image capture bounding frame 2B is substantially equal to the latent image transferred to the silver-salt film. That is, the size of the image capture bounding frame in the electronic image is substantially equal to the image capture range of the silver-salt photography.

For example, the monitor display image 8a shown in FIG. 5 is the image resulting when driving control is performed by the zoom/focus driving circuit 34 such that the shortest focal length of the silver-salt photography equipment corresponds to the shortest angle of view; it is the result of merging, by means of the signal processing circuit 45, the image capture bounding frame 2B on the original image obtained from the electronic image pickup element, and displaying the result.

The monitor display image 8b shown in FIG. 6 is the image resulting when driving and control are performed by the zoom/focus driving circuit 34 such that the angle of view is equivalent to an intermediate focal length of the silver-salt photography equipment. The original image is enlarged by a prescribed enlargement factor and merged with the display of the image capture bounding frame 2B of size reduced by a prescribed reduction factor by the signal processing circuit 45, and the result is displayed.

The monitor display image 8c shown in FIG. 7 is the image resulting when driving and control are performed by the zoom/focus driving circuit 34 such that the angle of view is equivalent to the longest focal length of the silver-salt photography equipment. The original image is enlarged by a prescribed enlargement factor and merged with the display of the image capture bounding frame of size reduced by a prescribed reduction factor by the signal processing circuit 45, and the result is displayed.

In the camera of this aspect, the display image processing for the LCD monitor 8 performed by the signal processing circuit 45 is executed based on the map table, shown in Table 1, in which are stored electronic zoom enlargement factors and image capture bounding frame 2B reduction factors corresponding to silver-salt photography lens focal lengths and zoom magnifications.

TABLE 1

| Silver-salt photography lens focal length f (mm) | Silver-salt lens zoom magnification α | Electronic zoom enlargement factor β | Bounding frame reduction factor γ |
| --- | --- | --- | --- |
| 35 | 1 (standard) | 1 (standard) | 1 (standard) |
| 50 | 1.4 | 1.2 | 0.83 |
| 70 | 2.0 | 1.4 | 0.71 |
| 100 | 2.9 | 1.7 | 0.59 |
| 140 | 4 | 2.0 | 0.5 |

The map table of Table 1 shows examples of electronic zoom enlargement factors (β) and image capture bounding frame reduction factors (γ) corresponding to, for example, the focal lengths of silver-salt photography equipment.

In Table 1, the focal length f of the photography lenses indicates the focal length f (mm) of the silver-salt photography equipment; zooming from 35 mm to 140 mm is possible.

The silver-salt photography lens zoom factor α indicates the zoom factor for each focal length, taking a photography lens focal length of 35 mm as reference. The electronic zoom enlargement factor β is the enlargement factor when performing electronic zoom, taking as reference the original image equivalent to the angle of view for a silver-salt photography equipment focal length of 35 mm. The image capture bounding frame 2B reduction factor γ is the reduction factor determining the image capture bounding frame 2B, taking as reference the image capture bounding frame 2B equivalent to the angle of view for a silver-salt photography equipment focal length of 35 mm.

The zoom factor (α), enlargement factor (β) and reduction factor (γ) are determined so as to satisfy the relations shown below.

$$\text{Zoom factor }(\alpha)=\text{Enlargement factor }(\beta)/\text{Reduction factor }(\gamma) \quad \text{(eq. 1)}$$

$$\text{Enlargement factor }(\beta)=1/\text{Reduction factor }(\gamma) \quad \text{(eq. 2)}$$

In this aspect, as shown in Table 1, settings are chosen such that the enlargement factor (β) and the reciprocal of the reduction factor (γ) are equal; however, settings are not limited to this, and for example the relation between the enlargement factor (β) and the reduction factor (γ) may be modified appropriately as necessary.

Further, this camera may be configured such that the image capture range displayed on the monitor coincides not with the image capture range of the silver-salt photography equipment, but with the angle of view of the optical viewfinder having a visual field substantially equal, for example, to the photography angle of view of the photography optical system.

Figure 8:
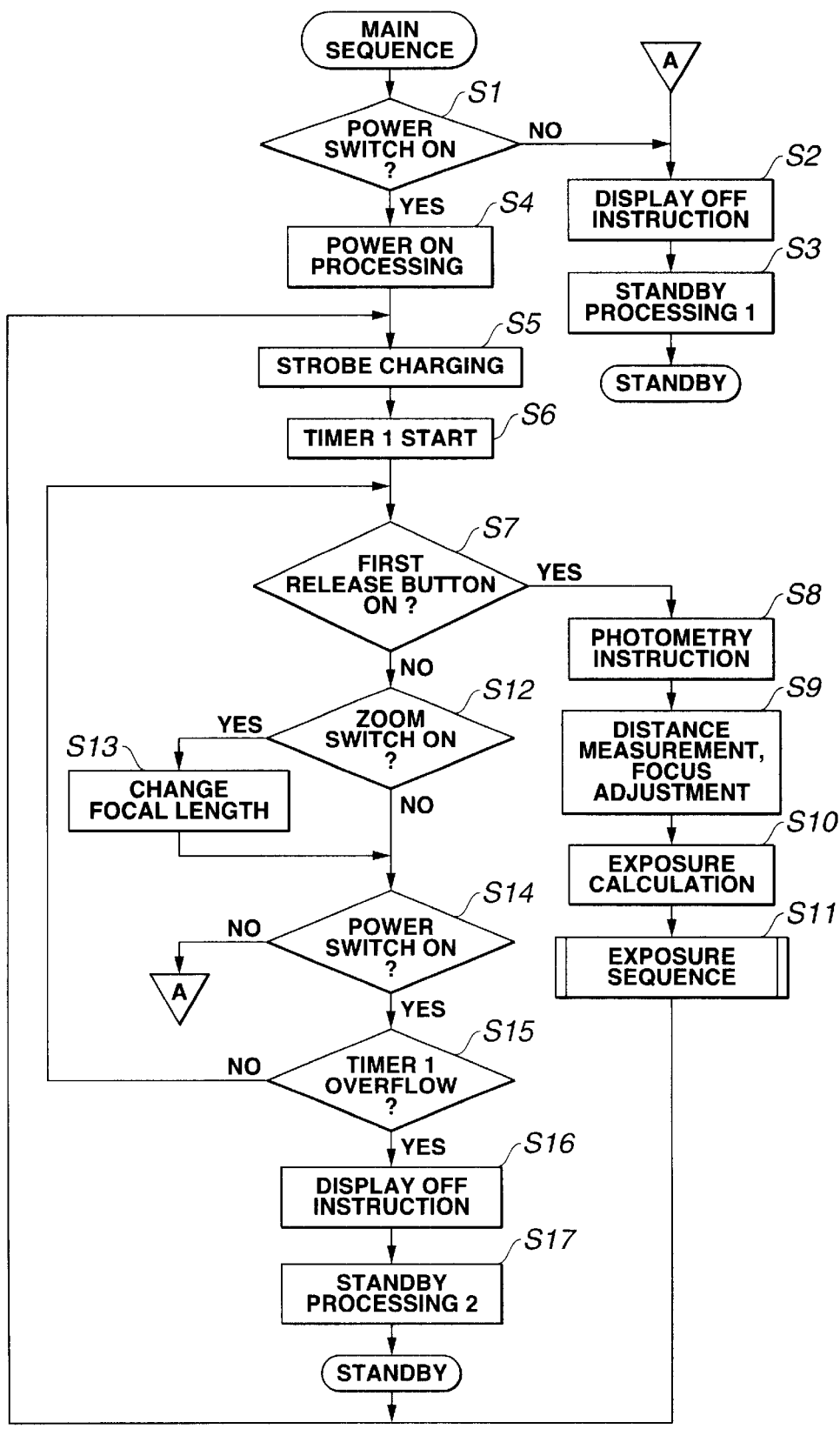
FIG. 8 is a flow chart showing one example of the flow of main sequence processing by the CPU in the camera of this invention.

Next, an example of control operation by the CPU 41 within the camera of this invention, as a feature of this invention, is explained in detail, referring to the main sequence flow chart shown in FIG. 8.

Suppose that the power supply switch (not shown) of the camera shown in FIG. 2 is turned on, or that batteries are inserted and power is turned on. Then the CPU 41 is started, camera operation begins, and the main sequence routine shown in FIG. 8 is executed. At this time, the signal processing circuit 45 shown in FIG. 2 awaits instructions from the CPU 41.

In the processing of step S1, the CPU 41 judges whether the camera power switch 4 is turned on or not, and if it is judged that the switch is turned on, execution is transferred to the succeeding step S4, and the processing of step S4 and subsequent processing is executed. On the other hand, if it is judged that the power switch 4 is turned off, execution is transferred to step S2, and the processing of step S2 and subsequent processing is executed.

When the power switch is off, in the processing of step S2 the CPU 41 instructs the LCD monitor 8 to turn off display via the signal processing circuit 45. Then processing is transferred to step S3, and control is executed such that standby processing 1 is performed. In this standby processing 1, before stopping operations of the CPU 41, conditions are set for when, after being stopped, the CPU 41 starts operation again. In this standby processing 1, after choosing settings such that operation is started the next time the power switch 4 is turned on, the CPU 41 stops operations and enters a standby state. When this standby state is canceled by operation of the power switch 4 or by other means, the CPU 41 again executes the main sequence routine, and processing of the initial step S1 is executed.

On the other hand, when the power switch 4 is turned on, the CPU 41 executes driving control in the processing of step S4 such that the photography lenses 21 and 23 are extended to wide positions from recessed positions, not shown. Next, in the processing of step S5 the CPU 41 executes control so as to charge the main capacitor, not shown, comprised by the strobe circuit 46.

Thereafter, the processing of the CPU 41 is transferred to step S6, in which a timer 1 incorporated within the CPU 41 begins counting. This timer 1 counts up once in each prescribed time interval. At the start of counting, the count value of this timer 1 is 0, it is cleared (reset), and counting is begun.

The CPU 41 continues processing and transfers execution to the decision processing of step S7; by means of this decision processing, a judgment is made as to whether the first release switch is on as a result of pressing of the release switch. Here, if it is judged that the first release switch is off, processing is transferred to step S12. Conversely, if it is judged that the first release switch is on, processing is transferred to step S8, and the processing of step S8 and subsequent processing is executed.

In the processing of step S8, the first release switch has been turned on, and so in this processing the CPU 41 executes instructions and control via the communication line 53 such that image signals from the imager on the IC chip 15 are captured, and the average brightness within the captured image is calculated based on the captured image signals. At this time, instead of photometry values as average brightnesses, center-weighted metering, in which the electrical signals for each pixel are weighted, may be used.

Thereafter the CPU processing is transferred to step S9, in which the interval of two images is determined based on signals input via the line sensor driving circuit 37, and data on the driving amounts for photography lenses in order to execute driving to focus positions is calculated. Then the CPU 41 changes the focal positions of each of the above photography lenses 21, 24 by transferring the driving amounts thus obtained to the zoom/focus driving circuit 34 and executing driving and control.

In the processing of the subsequent step S10, the CPU 41 calculates the aperture value of the diaphragm 22 and shutter speed to obtain correct exposure, using publicly known techniques, based on the object brightness obtained in the processing of the above step S8, a program diagram corresponding to the photography mode, and a film sensitivity detection circuit, not shown. That is, exposure calculation processing is performed, and processing is transferred to the succeeding step S11.

In the processing of step S11, the CPU 41 executes instructions and control so as to execute the exposure sequence (also called the photography sequence) described below, and by this means executes image capture by the CMOS imager and exposure of the silver-salt film 27. The CPU 41 processing returns to step S5, and in step S7 a standby state is entered until the first release button is depressed.

On the other hand, in the processing of the above step S7, when the first release switch is off, the CPU 41 judges whether the zoom switch is on through the decision processing of step S12. In step S12, if the CPU 41 judges that the switch is on, processing is transferred to step S13 to change focal lengths; if it is judged that the zoom switch is off, processing is transferred to step S14, and the processing of step S14 and subsequent steps is executed.

In the processing of step S13, the CPU 41 executes driving and control so as to change the focal lengths of the photography lenses 21, 23 according to operation of the zoom switch, and subsequent processing is transferred to the decision processing of step S14.

In the decision processing of this step S14, the CPU 41 again judges whether the camera power switch 4 is turned on or not; if it is judged that the switch is on, processing is transferred to the subsequent step S15, and the processing of step S15 and subsequent processing is executed. On the other hand, if it is judged that the power switch 4 is off, processing returns to the above step S2, and the processing of step S2 and subsequent processing is executed.

In the decision processing of step S15, the CPU 41 judges whether the above timer 1 has overflowed or not. That is, when the timer 1 begins counting and a prescribed time has elapsed, the timer overflows; in this decision processing, the presence or absence of overflow is judged. If it is judged that the timer 1 has overflowed, processing is transferred to step S16. Conversely, if it is judged that the timer 1 has not overflowed, processing returns to the above step S7, and the processing of step S7 and subsequent processing is executed repeatedly. That is, if the power switch 4 or other operation switches have not been operated even after the prescribed time has elapsed, the CPU 41 is put into the standby state in order to conserve energy.

Then, the CPU 41 judges that there has been no operation using an operation switch, and through the processing of step S16 instructions and control are executed such that the signal processing circuit 45 turns off the display of the LCD monitor 8, and processing is transferred to the next step S17.

In the processing of step S17, the CPU 41 executes control such that the standby processing 2 is executed. Similarly to the processing of the above step S3, the standby processing 2 sets conditions for when the CPU 41 begins operations again after having been stopped. In this standby processing, after making settings such that operation is begun as a result of a change in switches in response to an operation button, the CPU 41 stops operation and enters the standby state. When the standby state is canceled by operation of the power switch 4 or by other means, the CPU 41 again transfers processing to step S5, and the processing of step S5 and beyond is executed.

Figure 9:
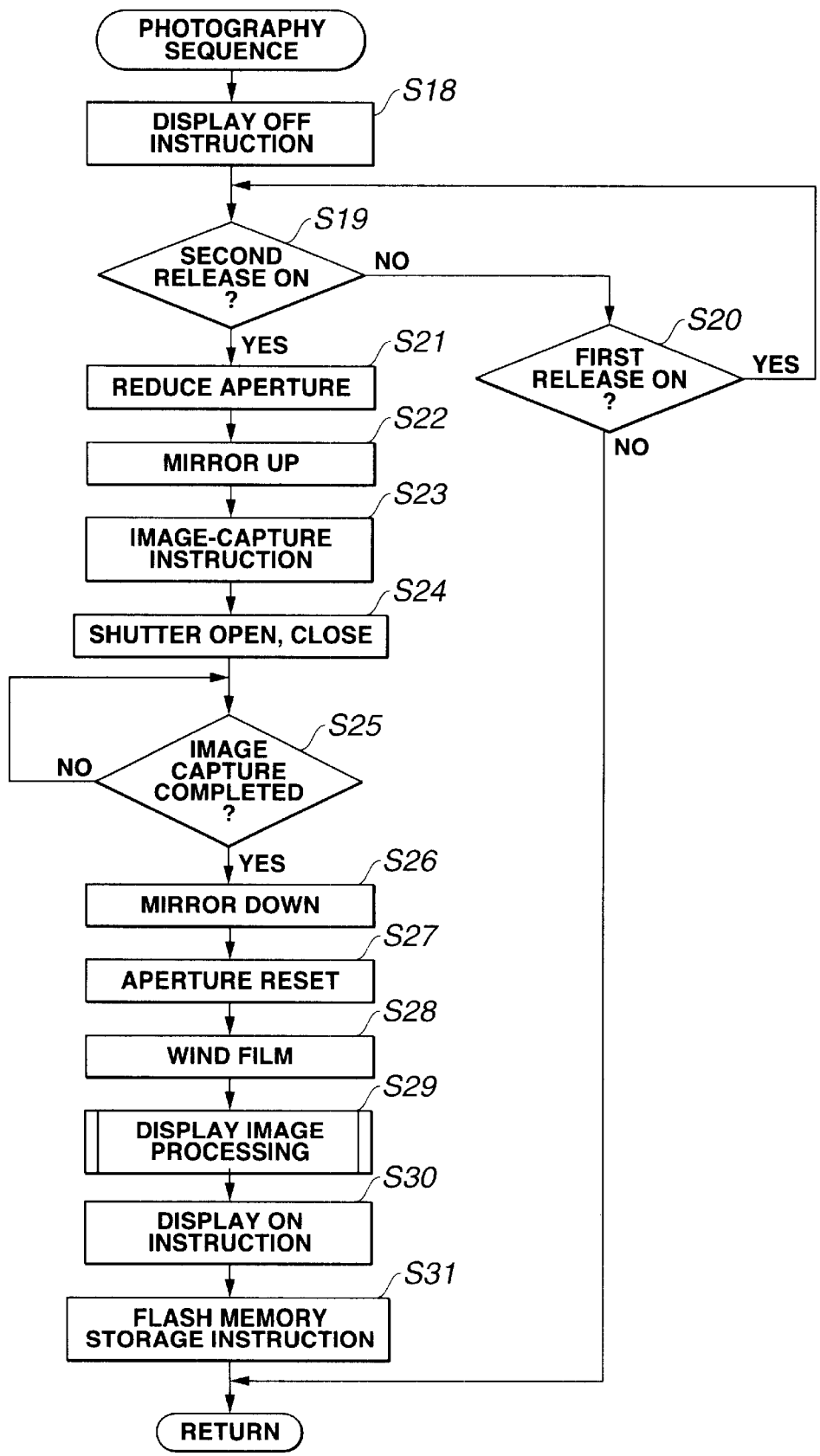
FIG. 9 is a flow chart showing an example of the flow of processing of the image capture sequence in FIG. 8; and, FIG. 10 is a flow chart showing an example of the flow of processing by the signal processing circuit of the display image processing of FIG. 9.

Next, the photography sequence (exposure sequence) processing of the above step S11 is explained in detail, referring to FIG. 9.

When the CPU 41 executes the processing of the exposure sequence (photography sequence) of step S11 shown in FIG. 8, a subroutine is executed in order to execute the photography sequence processing shown in FIG. 9.

First, in the processing of step S18, the CPU 41 executes instructions and control to the signal processing circuit 45 so as to turn off display of the LCD monitor 8, and then transfers processing to the decision processing of the subsequent step S19.

In the decision processing of step S19, the CPU 41 checks the state of the second release switch, which is turned on in response to full depression of the release switch, and if it is judged to be on, processing is transferred to step S21. Conversely, if the CPU 41 judges that the switch state is not turned on, processing is transferred to the decision processing of step S20.

In the decision processing of this step S20, the CPU 41 checks the state of the first release switch, and if it is judged not to be on, returns to the main routine shown in FIG. 8. Conversely, if it is judged to be on, processing is returned to the above step S19, and control is executed so as to repeat judgment processing.

Then, in the processing of step S21, the CPU 41 executes driving and control such that the diaphragm 22 is closed to a set aperture value by means of output from the diaphragm driving circuit 35. In this case, the aperture value is determined in advance in the main routine by publicly known techniques based on the object brightness, film sensitivity, program diagram, and similar.

In the processing of the subsequent step S22, the CPU 41 executes driving control such that the movable mirror 24 retreats to outside the photography optical path by means of output from the mirror driving circuit 36, and processing is then transferred to the subsequent step S23.

In the processing of step S23, the CPU 41 supplies a control signal (command) indicating image capture to the signal processing circuit 45. In the processing of subsequent step S24, the CPU 41 executes control such that the shutter 26 is driven so that the shutter speed is the preset value by means of the shutter driving circuit 38, and takes a picture. Here the shutter speed value is, like the aperture value, determined in advance in the main routine.

Then, in the decision processing of the subsequent step S25, the CPU 41 judges whether image capture has ended; if it is judged that image capture has ended, processing is transferred to step S26, and otherwise decision processing is performed again, and is repeated until image capture has ended.

Judgments at to whether image capture has ended or not are performed by means of control signals (commands) sent from the signal processing circuit 45 via the communication line 53. On receiving a control signal indicating that image capture has ended, the CPU 41 performs control so as to execute the processing of step S26 and subsequent steps.

Through the processing of step S26, the CPU 41 executes driving control such that the movable mirror 24, which had retreated due to the mirror-raising processing of the above step S22, is restored to its normal position in the photography optical path, and processing is transferred to step S27.

In the processing of step S27, the CPU 41 controls the diaphragm control circuit such that the diaphragm mechanism 22, which is in a contracted state due to the contraction processing of the above step S21, is returned to the open state, and processing is transferred to step S28.

In the processing of step S28, the CPU 41 performs driving control of the film driving circuit 39, to wind the silver-salt film 27 one frame's worth. Here, the magnetic head driving circuit 40 is driven and controlled by the CPU 41, and by this means the magnetic head magnetically records prescribed data in the magnetic recording layer of the silver-salt film 27; this magnetic recording operation is a publicly known technique, and so a detailed explanation is omitted.

On completion of magnetic recording of data in the silver-salt film 27, the CPU 41, in the subsequent step S29, supplies a control signal indicating display image processing to the signal processing circuit 45 via the communication line 53, and executes a processing routine to perform display image processing based on the result of display image processing by the signal processing circuit 45. Processing is then transferred to step S30.

In the processing of step S30, the CPU 41 instructs the LCD monitor 8 to perform display processing by supplying a control signal indicating display on the LCD monitor to the signal processing circuit 45, via the communication line 53. Then, the captured image is displayed on the LCD monitor 8 through control by the signal processing circuit 45.

Thereafter, in the processing of subsequent step S31, the CPU 41 supplies a command indicating data storage to the signal processing circuit 45. On receiving this command, the signal processing circuit 45 performs control so as to store in flash memory 50 digital image data compressed by image processing. On receiving a control signal indicating the end of data storage from the signal processing circuit 45, the CPU 41 completes routine processing for the photography sequence, and returns processing to the main routine.

Figure 10:
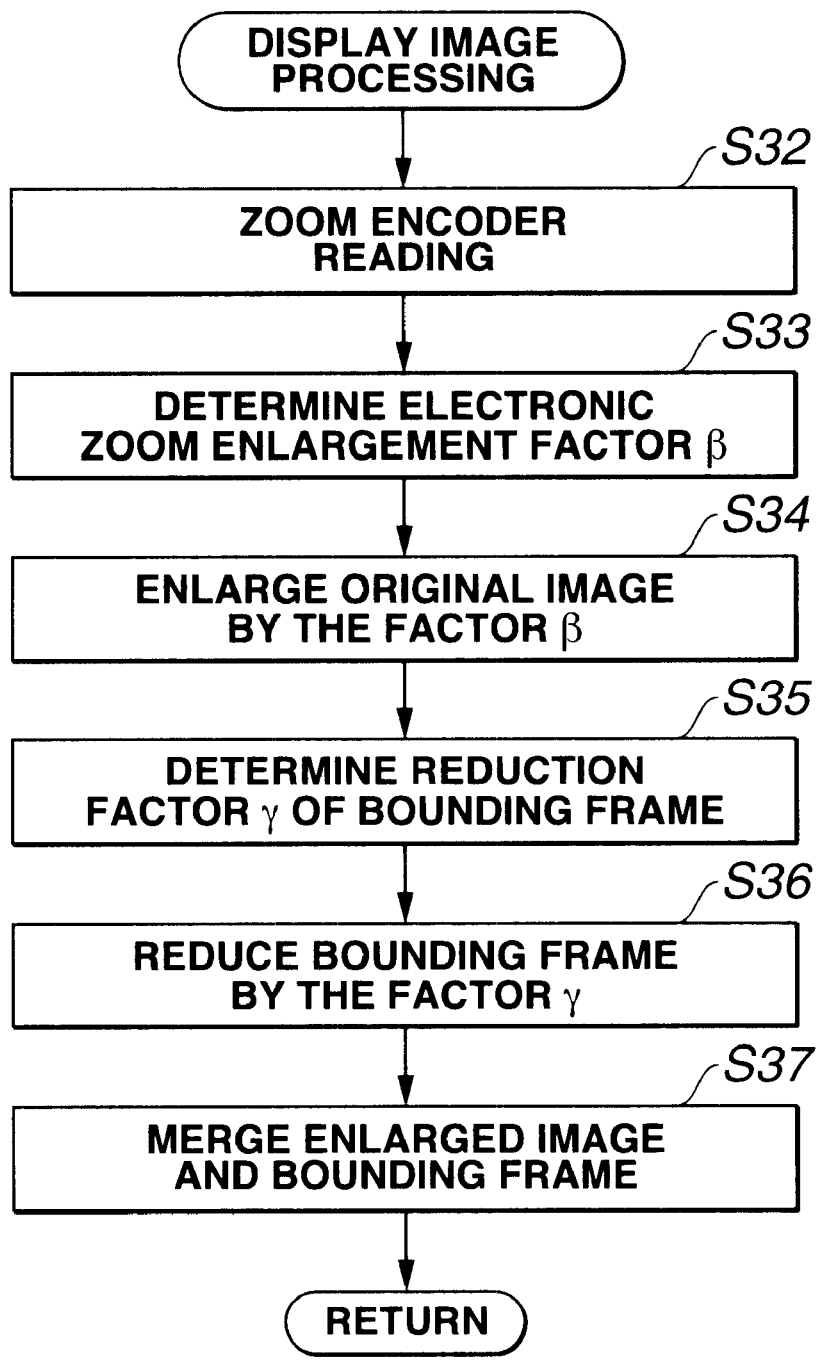

Next, the display image processing of the above step S29, which is a feature of this invention, is explained in detail, referring to FIG. 10.

When the display image processing of step S29 shown in FIG. 9 is executed, the CPU 41 supplies a control signal for execution of display image processing to the signal processing circuit 45 via the communication line 53, and by this means executes a subroutine to execute the display image processing shown in FIG. 10 by means of a processor within the signal processing circuit 45.

Then the processor (not shown) within the signal processing circuit 45, in the processing of step S32, detects the focal lengths of the photography lenses 21, 23 from the zoom encoder, not shown. In the processing of subsequent step S33, this processor uses the map data shown in Table 1 to determine the electronic zoom enlargement factor $\beta$ to perform enlargement of the electronic image, based on the detected focal length information. Requests for the above focal length information are detected by the CPU 41, and the CPU 41 supplies the detected focal length information to the signal processing circuit 45.

Then, in the processing of subsequent step S34, the processor within the signal processing circuit 45 converts image data stored in SRAM 48 or in DRAM 49 so as to perform enlargement at the electronic zoom enlargement factor $\beta$, and performs storage control so as to again store the converted image data in the above memory.

Then, in the processing of subsequent step S35, the image capture bounding frame 2B reduction factor $\gamma$ is similarly determined from the map data shown in the above Table 1, and processing is transferred to step S36.

In the processing of step S36, the processor within the signal processing circuit 45 performs conversion processing by means of the signal processing circuit 45 such that the image data of the image capture bounding frame 2B stored in SRAM 48 or in DRAM 49 is reduced by the reduction factor $\gamma$, and performs storage control such that the converted image data is again stored in the above memory.

Then, in the processing of step S37, the processor of the signal processing circuit 45, by means of the signal processing circuit 45, merges the image data created by the processing of the above step S34 with the image data created by the processing of the above step S36, and performs control so as to store the merged data in memory.

When display image processing is thus completed, the processor of the signal processing circuit 45 supplies to the CPU 41 a control signal indicating that display image processing is completed; on receiving this signal the CPU 41 executes monitor display of the image data captured by the signal processing circuit 45, by applying the display turn-on instruction of step S30 in the photography sequence processing routine shown in the above-mentioned FIG. 9.

Hence in this aspect, by means of the signal processing circuit 45, display image processing is performed such that the size of the image capture bounding frame of the merged electronic image displayed on the LCD monitor 8 is substantially equal to the image capture range of the silver-salt photography means. That is, by combining electronic zoom and an image capture bounding frame, image display equivalent to the photography angle of view of the silver-salt photography equipment can be performed without excessively raising the electronic zoom enlargement factor; hence a satisfactory display image can be obtained without coarseness in the image displayed on the monitor.

This invention is not limited to the above-described aspect; applications of the above aspect also conform to this invention.

In this aspect of the invention, an explanation of display image processing by the signal processing circuit 45 was given based on the map data for the zoom factor ($\alpha$), enlargement factor ($\beta$) and reduction factor ($\gamma$) corresponding to focal lengths shown in Table 1; however, this invention is not thereby limited, and these factors can be changed appropriately as necessary. Further, a configuration may be employed in which map data with these factors modified in advance is used to perform display image processing.

As explained above, by means of this invention, a camera for both silver-salt photography and electronic image capture can be supplied such that, in photography using an electronic zoom function, the image displayed on the monitor does not become coarse even when the zoom ratio of the silver-salt system zoom optical mechanism is high, and satisfactory display images can be obtained.

What is claimed is:

1. A camera which exposes silver-salt film with an object image, comprising:
    a zoom optical system which forms said object image on said silver-salt film;
    an image capture element which captures an electronic image of said object image;
    an image capture optical system which forms said object image on said image capture element, said image capture optical system being provided separately from said zoom optical system, and having an angle of view which covers the broadest image capture angle of view of said zoom optical system;
    memory which stores the image data of an image capture bounding frame;
    a signal processing circuit which merges the electronic image captured by said image capture element and the image data of said image capture bounding frame stored in said memory, in which merging is performed after said electronic image has been enlarged by a prescribed enlargement factor which is lower than a zoom factor that is determined based on a value of the focal length of said broadest image capture angle of view of said zoom optical system and a value of the zoomed focal length, and the image data of said image capture bounding frame has been reduced by a prescribed reduction factor; and
    a monitor device which displays the electronic image merged by said signal processing circuit.

2. The camera according to claim 1, having a map table referencing the enlargement factor of said electronic image and the reduction factor of said image capture bounding frame based on the zoom factor of said zoom optical system.

3. A camera, comprising:
    a zoom optical system which forms an object image on the silver-salt film of silver-salt photograph means;
    a photography optical system which forms said object image on an image capture element, said photography optical system being provided separately from said zoom optical system, and having an angle of view which covers the broadest photography angle of view of said zoom optical system;
    a signal processing circuit which enlarges an electronic image by a prescribed enlargement factor which is lower than a zoom factor of said zoom optical system according to said zoom factor, reduces the image data of a frame indicating the image capture range by a prescribed reduction factor, and then merges this enlarged electronic image with a frame indicating the image capture range, the size of the frame indicating the image capture range in the electronic image merged by the signal processing unit being substantially equal to the image capture range of said silver-salt photography means; and
    a monitor device which displays said electronic image processed by said signal processing circuit.

4. The camera according to claim 3, wherein said signal processing circuit has a map table for referencing the enlargement factor of said electronic image and the reduction factor of said frame indicating the image capture range, based on the zoom factor of said zoom optical system.

5. The camera according to claim 3, having the following relations between the zoom factor $\alpha$ of said zoom optical system, the enlargement factor $\beta$ of said electronic image, and the reduction factor $\gamma$ of said frame indicating the image capture range:

$\alpha = \beta/\gamma$ and $\beta = 1/\gamma$.

6. A camera, comprising:
    a photography optical system in which the focal length for exposing silver-salt film with an object image is variable;
    an optical view-finder, having a visual field substantially equal to the photography angle of view of said photography optical system;
    an image capture optical system which is provided separately from said photography optical system so that said object image is captured by an electronic image capture element;
    a monitor device which displays an electronic image capture by said electronic image capture element; and,
    a signal processing circuit for controlling said monitor device, which controls said monitor device so as to enlarge and display said electronic image by a prescribed enlargement factor, which is lower than a setting factor of said photography optical system, according to the focal length of said photography optical system, while superimposing on this displayed image a bounding frame equal to said visual field of said optical view-finder.

7. A camera, comprising:
    silver-salt photography means which comprises a photography optical system with variable focal length, and transfers an object image to silver-salt film;
    electronic image capture means, which comprises an image capture optical system having an angle of view which includes the photography angle of view of said silver-salt photography means, for capturing said object image and converting the same into an electronic image;
    electronic zoom means which performs enlargement processing of the electronic image captured by said electronic image capture means by a prescribed enlargement factor, which is lower than a setting factor of said photography optical system, according to the focal length of said photography optical system; and
    display means which displays the electronic image enlarged by said electronic zoom means, while superimposing on this displayed image a frame indicating the image capture range of said silver-salt photography means, according to the factor of said photography optical system and the enlargement factor of said electronic zoom means.

8. The camera according to claim 7, wherein said display means merges and displays the frame indicating the image capture range, substantially equal to the image capture range of said silver-salt photography means, with the electronic image output from said electronic zoom means.

9. The camera according to claim 8, wherein said display means reduces the image data of said image capture bounding frame by a prescribed reduction factor based on the focal length of said photography optical system of said silver-salt photography means, and merges and displays the reduced image with the electronic image output from said electronic zoom means.

10. A camera which exposes silver-salt film with an object image, the camera comprising:

a zoom optical system which forms said object image on said silver-salt film;

an image capture element which captures an electronic image of said object image;

an image capture optical system which forms said object image on said image capture element, said image capture optical system being provided separately from said zoom optical system, and having an angle of view which covers the broadest image capture angle of view of said zoom optical system;

memory which stores the image data of an image capture bounding frame;

a signal processing circuit which merges the electronic image capture bounding frame stored in said memory, in which merging is performed after said electronic image has been enlarged by a prescribed enlargement factor which is lower than a zoom factor that is determined based on a value of the focal length of said broadest image capture angle of view of said zoom optical system and a value of the zoomed focal length and the image data of said image capture bounding frame has been reduced by a prescribed reduction factor;

a map table for referencing the enlargement factor of said electronic image and the reduction factor of said image capture bounding frame based on the zoom factor of said zoom optical system; and a monitor device which displays the electronic image merged by said signal processing circuit.

11. A camera comprising:

a zoom optical system which forms an object image on the silver-salt film of silver-salt photograph means;

a photography optical system which forms said object image on an image capture element, said photography optical system being provided separately from said zoom optical system, and having an angle of view which covers the broadest photography angle of view of said zoom optical system;

a signal processing circuit which enlarges an electronic image by a prescribed enlargement factor which is lower than a zoom factor of said zoom optical system according to said zoom factor, reduces the image data of a frame indicating the image capture range by a prescribed reduction factor, and then merges said enlarged electronic image which said reduced image data of the frame indicating the image capture range, the size of the frame indicating the image capture range in the electronic image merged by said signal processing circuit being substantially equal to the image capture range of said silver-salt photography means, the following relations existing among the zoom factor $\alpha$ of said zoom optical system, the enlargement factor $\beta$ of said electronic image, and the reduction factor $\gamma$ of said frame indicating the image capture range:

$\alpha=\beta/\gamma$ and $\beta=1/\gamma$; and a monitor device which displays said electronic image processed by said signal processing circuit.

* * * * *